United States Patent Office 3,296,245
Patented Jan. 3, 1967

3,296,245
PROCESS FOR THE PREPARATION OF METHYL-ALPHA-D-GLUCOSIDE
Donald W. Kaiser and Stephen Fuzesi, Hamden, and Robert J. Raynor, North Branford, Conn., assignors to Olin Mathieson Chemical Corporation, a corporation of Virginia
No Drawing. Filed Mar. 11, 1965, Ser. No. 439,087
13 Claims. (Cl. 260—210)

This invention relates to an improved process for the preparation of methyl-alpha-D-glucoside.

Methyl glucoside has been used extensively in the preparation of alkyd resins and more recently as a starting polyol for use in the preparation of urethane foams, with prior oxyalkylation. One factor that has inhibited the use of methyl-alpha-D-glucoside in the chemical industry is its relative high price. Previously, the glucoside was prepared from starch on a commercial scale by employing a two-step process. In the first step an aqueous solution of starch was hydrolyzed with an acid catalyst, the resulting solution was heated to remove water to yield anhydrous dextrose. The resulting dextrose solution was then reacted, in a separate reaction, with methanol in the presence of an acid catalyst to liberate water and to form methyl-alpha-D-glucoside. The numerous process steps required in this technique markedly increased the cost of preparing methyl-alpha-D-glucoside and also affected the yields adversely.

It is a primary object of this invention to overcome the disadvantages inherent in previously known techniques for the preparation of methyl-alpha-D-glucoside.

Another object of the invention is to provide an improved single-step process for preparing methyl-alpha-D-glucoside directly from starch.

A further object of the invention is to provide an improved acid catalyst system for use in the preparation of methyl-alpha-D-glucoside.

These and other objects of the invention will be apparent from the following detailed description thereof.

It has now been discovered that substantial yields of methyl-alpha-D-glucoside can be obtained by reacting starch with methanol in the presence of a Lewis acid catalyst under pressure. The resulting methyl-alpha-D-glucoside crystals are separated from the methanol solution, either with or without prior removal of methanol by distillation, and the remaining filtrate may be further processed for recovery of additional methyl-alpha-D-glucoside.

Any starch may be employed in preparing methyl-glucoside by the process of this invention. The starch may be in anhydrous form or may be in the wet stage, containing as much as 20 percent by weight of water. Typical starches which may be conveniently employed include potato starch, corn starch, rice starch, tapioca starch, wheat starch, and mixtures thereof.

At least a stoichiometric proportion of methanol is reacted with starch to yield methyl-glucoside, but it is preferred to employ an excess of methanol. Preferably, the proportion of methanol is in the range between about 4 and about 20 moles of methanol per glucose unit weight of starch, but greater proportions may be employed if desired. When a ratio of less than about 4:1 is employed, the starch is not easily dissolved and an inert solvent is then necessary to obtain a significant rate of reaction.

Any Lewis acid catalyst may be employed to catalyze the reaction in a catalytic proportion. Typical examples of suitable Lewis acid catalysts include boron trifluoride etherate, aluminum trichloride, ferric chloride, stannic chloride, titanium tetrachloride, etc., and mixtures thereof. The preferred catalyst is boron trifluoride etherate. If desired, inorganic acids such as hydrochloric acid may be employed as the catalyst. The proportion of catalyst is generally in the range between about 0.5 and about 5, and preferably between about 1 and about 3 percent by weight of the starch but greater or lesser proportions may be employed if desired.

The reaction may be carried out in an inert atmosphere, for example in an atmosphere of nitrogen, carbon dioxide or helium, but it is not necessary since the methanol atmosphere is generally satisfactory. The reaction is carried out under a pressure in the range between about 150 and about 500 p.s.i., and preferably between about 175 and about 375 p.s.i.

The reaction temperature will vary depending upon the degree of completion of the reaction, time of reaction, catalyst concentration, reactant proportions, and the like. However, generally the temperature is maintained in the range between about 80 and about 200° C., and preferably between about 100 and 150° C.

After the reaction has progressed to the desired degree, the reaction product is cooled and crystals of methyl-alpha-D-glucoside are separated by filtration or other solids-liquid separation technique. It is preferred to cool the slurry to below room temperature after separating a substantial portion, between about 30 and about 40 percent by weight of the total methanol, and recovering the resulting crystals of methyl-alpha-D-glucoside. The solids are then dried and stored for use.

The clarified acidic methanol and degradated starch solution may be recycled to the reactor for further reaction of the degradated starch with the methanol for forming an additional amount of methyl-glucoside. This second cycle can be repeated several times (2–5 times) to increase the yield over 90–95 percent based on the weight of starch. Generally there is no need to add additional catalyst, but makeup catalyst can be added if desired.

If desired, fresh starch, with or without additional methanol, may be added with the recycled methanol solution to further improve the efficiency of each cycle.

Directly reacting starch with methanol in one step in accordance with the process of this invention markedly improves the economics of the process for producing methyl-alpha-D-glucoside. In addition, recycling of the aqueous methanol-degradated starch solution containing the catalyst markedly increases the yield and reduces the cost of preparing the methyl-glucoside.

Various other alcohols such as ethanol, allyl alcohol, benzyl alcohol, phenol and the like are not as effective as methanol in this process, although some product can be obtained.

The following examples are presented to define the invention more fully without any intention of being limited thereby.

Example I

The mixture of 192 gms. methanol, 195 gms. starch (with 17 percent $H_2O$ in it) and 6 cc. $BF_3$ etherate was heated to 135° C. under $N_2$ pressure in a 1 liter stainless steel autoclave. The pressure of the system at initiated state was 200 p.s.i. At 135° C. 350 p.s.i. was recorded.

Heating time at 135° C. was 90 minutes.

The liquid product mixture was neutralized at room temperature using calcium carbonate, and after reduction of volume of methanol the crystalline methyl glucoside was separated by filtration. The approximate yield was 41 percent of crystalline methyl-alpha-D-glucoside, having a melting point of 164–165° C.

Example II

The reactor, a 1 liter stainless steel, stirring autoclave, was charged with 186 gms. (one glucose unit weight of starch, 162 grams, containing 13% $H_2O$) common potato starch, 384 gms. (12 moles) methanol, and 6 cc. $BF_3$ etherate. The system was pressure tested with nitrogen at 500 p.s.i. and when secure was bled to a pressure of 200 p.s.i.

The stirrer was started and heat applied to the reactor for 25–30 minutes, at which time a temperature of 135° C. and a pressure of 350 p.s.i. was recorded. The temperature was maintained at 135° C. for 30 minutes. The mixture was then cooled to room temperature (5–10 min.). The crude reaction product was then filtered and the volume of the methanol was reduced by distillation. The crystalline methyl glucoside was then removed by filtration. The filtrate was recharged to the autoclave and the system pressure tested and bled as before.

After 20 minutes of heating a temperature of 100° and a pressure of 300 p.s.i. were recorded. The temperature was maintained at 100° C. for 30 minutes, then the reactor was cooled and the product of methyl-alpha-D-glucoside isolated as before.

This second cycle was repeated a third time.

Total yield was 130 gms. of methyl-alpha-D-glucoside (67 percent).

In another experiment the total yield after the fourth cycle was 76.5 percent.

Additional cycles increase the yield over 95 percent.

Various modifications of the invention may be employed, some of which have been referred to above, without departing from the spirit of the invention. What is desired to be secured by Letters Patent is:

1. The process for preparing methyl-alpha-D-glucoside which comprises reacting starch with methanol in the presence of a Lewis acid catalyst, said reaction being carried out at an elevated pressure in an inert atmosphere, and recovering the solid methyl-alpha-D-glucoside produced thereby.

2. The process of claim 1 wherein a reaction is carried out at a temperature in the range between about 80 and about 200° C.

3. The process of claim 1 wherein said Lewis acid catalyst is boron trifluoride etherate.

4. The process of claim 1 wherein said reaction is carried out in a pressure in the range between about 150 and about 500 p.s.i.

5. The process of claim 1 wherein the proportion of methanol to starch initially present in the reaction is in the range between about 4 and about 20 moles of methanol per glucose unit weight of starch.

6. The process for preparing methyl-alpha-D-glucoside which comprises reacting starch with methanol in the presence of boron trifluoride etherate, the proportion of said boron trifluoride etherate being between about 0.5 and about 5 percent by weight of said starch, at a temperature in the range between about 80 and about 200° C. and at a pressure in the range between about 150 and about 500 p.s.i., and separating the resulting solid methyl-alpha-D-glucoside from the resulting methanol solution.

7. The process of claim 6 wherein said methanol solution is heated at an elevated temperature under pressure to yield additional solid methyl-alpha-D-glucoside and said additional glucoside is separated from the remaining methanol solution.

8. The process of claim 6 wherein said methanol solution is admixed with additional starch, the resulting mixture is heated to a temperature within said temperature range at a pressure within said pressure range, and additional solid methyl-alpha-D-glucoside is separated from the resulting methanol solution.

9. The process for preparing methyl-alpha-D-glucoside which comprises reacting starch with methanol in the presence of boron trifluoride etherate, the proportion of said boron trifluoride etherate being between about 1 and about 3 percent by weight of said starch, at a temperature in the range between about 100 and about 150° C. and at a pressure in the range between about 175 and about 375 p.s.i., and separating the resulting solid methyl-alpha-D-glucoside from the resulting methanol solution.

10. The process of claim 9 wherein said methanol solution is heated at an elevated temperature under pressure to yield additional solid methyl-alpha-D-glucoside and said additional glucoside is separated from the remaining methanol solution.

11. The process of claim 9 wherein said methanol solution is admixed with additional starch, the resulting mixture is heated to a temperature within said temperature range at a pressure within said pressure range, and additional solid methyl-alpha-D-glucoside is separated from the resulting methanol solution.

12. The process for preparing methyl-alpha-D-glucoside which comprises reacting starch with methanol in the presence of a catalytic proportion of a Lewis acid catalyst at elevated temperature and elevated pressure, separating solid methyl-alpha-D-glucoside from the resulting acidic methanol solution, drying said solid methyl-alpha-D-glucoside, heating said acidic methanol solution at an elevated temperature and at an elevated pressure, to yield an additional portion of solid methyl-alpha-D-glucoside.

13. The process of claim 12 wherein said acidic methanol solution is admixed with additional starch, additional methanol and additional catalyst prior to heating.

References Cited by the Applicant

UNITED STATES PATENTS 2,356,565   8/1944   Chwala.
2,374,236   4/1945   Salzberg et al.

JAMES O. THOMAS, JR., *Acting Primary Examiner.*

JOHNNIE R. BROWN, *Assistant Examiner.*